United States Patent

Hauck, Jr. et al.

[11] Patent Number: 5,308,491
[45] Date of Patent: May 3, 1994

[54] BIOLOGICAL WASTEWATER TREATMENT PROCESS

[75] Inventors: Henry F. Hauck, Jr., Baton Rouge; Lawrence J. Landry, Jr., Donaldsonville; Jen-Hsiang Kao, Baton Rouge; Sawnra W. Wade, Baton Rouge; M. Dales Mayes, Baton Rouge; Stephen J. Caldwell, Baton Rouge, all of La.

[73] Assignee: The Dow Chemical Company, Midland, Mich.

[21] Appl. No.: 767,284

[22] Filed: Sep. 27, 1991

[51] Int. Cl.$^5$ ............................................ C02F 3/12
[52] U.S. Cl. .................................. 210/614; 210/626; 210/631; 210/739
[58] Field of Search .............. 210/614, 623, 626, 627, 210/631, 739, 746

[56] References Cited

U.S. PATENT DOCUMENTS

| | | | |
|---|---|---|---|
| 4,078,129 | 3/1978 | Yamagata et al. | 526/11 |
| 4,276,174 | 6/1981 | Breider et al. | 210/614 |
| 4,303,527 | 12/1981 | Reimann et al. | 210/614 |
| 4,595,505 | 6/1986 | Dor | 210/614 |
| 5,094,752 | 3/1992 | Davis et al. | 210/614 |

FOREIGN PATENT DOCUMENTS

| | | | |
|---|---|---|---|
| 2631825 | 1/1978 | Fed. Rep. of Germany | 210/614 |
| 106596 | 8/1980 | Japan . | |
| 1174388 | 8/1985 | U.S.S.R. . | |

OTHER PUBLICATIONS

George Tchobanoglous, *Wastewater Engineering: Treatment Disposal Reuse*, Second Edition, Metcalf & Eddy, Inc., pp. 513–522.

Emil Supp, *How to Produce Methanol from Coal*, 1990, p. 155.

*Primary Examiner*—Thomas Wyse

[57] ABSTRACT

In a biological wastewater treatment process including secondary clarification, the improvement comprising monitoring the salinity of the wastewater flowing to secondary clarification and adjusting the salinity of the wastewater flowing to secondary clarification by adding water or by adding salt.

12 Claims, 1 Drawing Sheet

BIOLOGICAL WASTEWATER TREATMENT PROCESS

BACKGROUND OF THE INVENTION

The present invention relates to biological wastewater treatment processes including secondary clarification. More particularly, but without limitation thereto, the present invention relates to activated sludge wastewater treatment processes, and especially to those activated sludge wastewater treatment processes employing oxygen-enriched air or substantially pure oxygen for aeration of the material in the reactor of the process.

Activated sludge wastewater treatment processes in general terms employ a reactor in which a suspension of various microorganisms aerobically biodegrade dissolved and colloidal organics in the wastewater flowing into the process, with oxygen being continuously supplied to the suspension in the form of air, oxygen-enriched air, or pure oxygen. A downstream settling tank or secondary clarifier gravitationally separates the flocculated microorganisms from the treated wastewater. A portion of the suspension recovered from the secondary clarification step of the process is recycled to the reactor, and the remainder is passed through a sludge treatment process to remove any remaining water from the sludge and to render the sludge suitable for disposal by landfilling, for example, or for further use, e.g., as a fertilizer.

A species of an activated sludge process which has been briefly mentioned above aerates the reactor with pure or substantially pure oxygen. This sort of process, sometimes referred to in industry as Union Carbide's "Unox" process, is very often employed where space for the activated sludge reactor or reactors (typically there are several reactors in series) is limited or where there is a desire to reduce capital costs and a supply of oxygen is on hand, since the pure oxygen process supplies the same amount of oxygen as a conventional process using ordinary air, in roughly one-fifth the volume required in a conventional process. The reactors in a pure oxygen activated sludge process are thus typically small compared to the reactors in other activated sludge processes, and have a much shorter residence time for materials passing through the reactors.

Because of the much shorter residence times and higher throughputs associated with the pure oxygen activated sludge treatment processes, those changes in the character of the influent wastewater which could adversely affect the system's microorganisms or the secondary clarification are not as easily counteracted and can be more critical in their effects. Relatively minor changes in the character of the incoming wastewater which would have little adverse effect in other processes because of a dilution factor in a large reactor, or which could be corrected over time with little damage to the overall process or to the waters in which the treated effluent is to be discharged, become much more troublesome in a pure oxygen activated sludge process.

For this reason, a thorough understanding and appreciation of the effect on the overall process of changes of various magnitudes in the character and composition of the incoming wastewater stream becomes critical, if damage either to the process or to the environment is to be avoided.

SUMMARY OF THE INVENTION

The present invention is based on the discovery that relatively minor changes in the salinity content by which is meant the electrolytes resulting from alkali or alkaline earth metals with halide, e.g., NaCl and $CaCl_2$ and the like, of an incoming wastewater stream, even though not necessarily appreciably adversely affecting the activity and viability of the microorganisms in a process, can nevertheless significantly adversely affect the overall process by interfering with the secondary clarification process and with the recovery of a portion of the microorganism suspension for recycling to the reactor.

The present invention proposes a process for dealing with this potential environmental hazard, and in a biological wastewater treatment process including secondary clarification which comprises monitoring the amount of these salts in the wastewater flowing to secondary clarification and adjusting the salinity of the wastewater flowing to secondary clarification by adding water or by adding salt, as required.

DETAILED DESCRIPTION OF THE PREFERRED EMBODIMENTS

Figure 1:
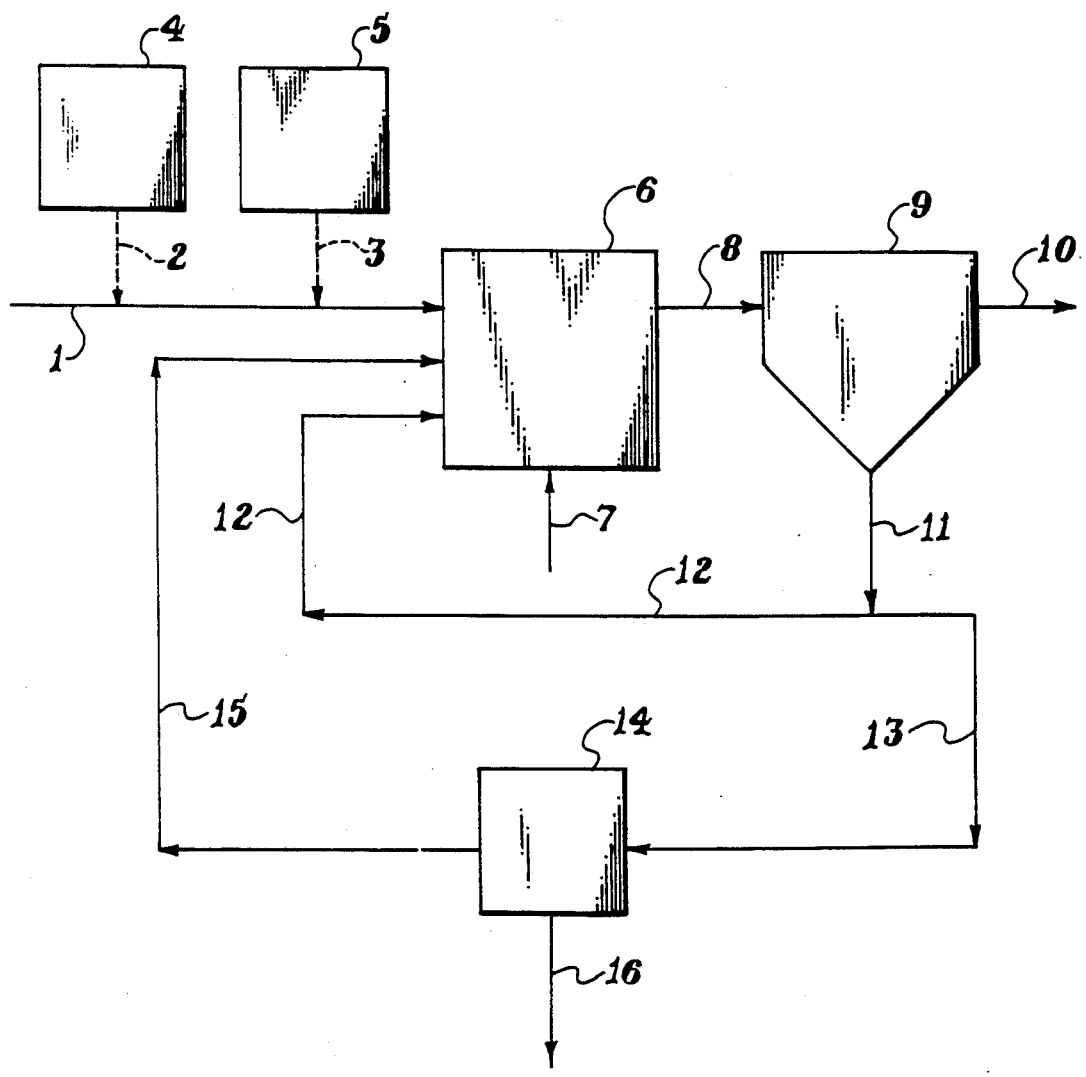
FIG. 1 is a schematic view of an activated sludge wastewater treatment process modified according to the teachings contained herein.

In general, it is thought that the process of the present invention will be useful in any of the biological wastewater treatment processes including a secondary clarification step, although the invention can be expected to be of particular utility in those processes which are characterized by short average residence times in the reactors and high throughputs, e.g, average residence times of from about 1 to about 24 hours, especially from about 1 to about 12 hours, and most especially from about 1 to about 4 hours.

The present invention is expected to find its greatest utility in pure oxygen activated sludge processes such as the "Unox" process developed by Union Carbide Corporation and described more particularly in "The Use of High Purity Oxygen in the Activated Sludge Process", Volumes 1 and 2, CRC Press (1978) (edited by J.R. MeWhirter), and especially in pure oxygen activated sludge processes which are designed to operate at salt concentrations of 3% or greater. In this regard, the process will preferably be employed in those treatment systems which have been designed for the treatment of wastewater having an average salt (NaCl and $CaCl_2$) content of from about 0.001 to about 14 percent, while a more preferred application will be in processes for the treatment of incoming wastewater having an average salt content of from about 2 to about 10 percent. In a most preferred application of the process, the designed-for salt content of the incoming wastewater will be from about 3 to about 8 percent. Wastewaters having these various high contents can result, for example, from processes for the production of propylene oxide from propylene chlorohydrin and caustic or involving any process producing saline wastewater.

It is anticipated that a one-half of one percent change in the salinity content of a system designed to operate at levels normally of about 12 percent or higher will be less significant or pose less of a hazard to the proper operation of the system as a whole, than in a system operating normally at levels of about 6 percent or lower, for example, because the magnitude of the change in the density of the wastewater, biosolids, or both, is less at higher salt content than at lower salt content.

Referring now to FIG. 1, an activated sludge wastewater treatment process is illustrated which incorporates the monitoring and adjustment process of the present invention. Untreated wastewater 1 is monitored for its salt content on preferably a continuous basis by means for accomplishing this function, such as a conductivity probe (not shown), by titration of samples or refractive index analysis. This monitoring may also be on a periodic or intermittent basis, and may be initiated manually or preferably is conventionally initiated by some sort of automated means (not shown) for remotely actuating the particular monitoring device or devices employed.

If the amount of these salts in the incoming wastewater is judged to be outside of acceptable limits for achieving the desired degree of separation and thickening in the secondary clarifier 9 (as discussed below), a salt 2, such as NaCl and/or $CaCl_2$, or water 3 is added from sources 4 and 5, respectively, of these materials to bring the stream 1 back within acceptable limits.

The stream of wastewater 1 is then communicated to a reactor 6 which contains the various microorganisms used to biodegrade the dissolved and colloidal organics in the stream 1 and which is aerated with a stream 7 of pure or substantially pure oxygen. The sludge liquor from the reactor 6 is then passed on to the secondary clarifier 9 via stream 8.

In the secondary clarifier 9, the sludge is gravitationally settled out in stream 11 and treated water is removed from the top of the clarifier 9 in stream 10. A portion 12 of the sludge from secondary clarifier 9 is recycled and fed back into the reactor 6, while a second portion 13 is removed from the cycle and fed to a solid sludge recovery means 14 such as a filter press. The filtrate 15 from the filter press 14 is sent back to the reactor 6, while the solid sludge cake 16 is disposed of in a conventional manner such as by incineration or landfilling.

Each of the steps and apparatus described above are conventionally known in pure oxygen activated sludge wastewater treatment systems, with the exception of the provision for monitoring and adjusting the amount of the NaCl and $CaCl_2$ salts in the wastewater being fed to the activated sludge system.

This monitoring and adjustment is illustrated in FIG. 1 as occurring prior to the wastewater stream's entering the reactor 6, and this is a preferred arrangement, but unless the amount of these salts in the incoming stream 1 is so greatly changed from the amount to which the system has become accustomed that the stream 1 might adversely affect the activity or viability of the system's microorganisms, then it is not critical whether the monitoring and/or adjustment occurs upstream of the reactor 6, in the reactor 6, or in the stream 8 so long as any required adjustment occurs upstream of the secondary clarifier 9.

The magnitude of adjustment required of the wastewater stream to be fed to the clarifier 9 depends on the settling behavior of the sludge in a particular secondary clarifier 9 when the incoming wastewater stream 8 is of a higher or lower salt content than the wastewater already in the clarifier 9.

If the wastewater coming into the secondary clarifier has too high a salt content than that compared to the wastewater already in the clarifier, for example where the effluent from one of the salt wastewater producing processes mentioned earlier is conventionally processed with a less concentrated effluent from another process and the flow rate of the high-salt effluent suddenly is increased relative to the low-salt effluent, then a stratification of the sludge in the clarifier tends to occur so that less of the sludge can be returned to the reactor 6. In time, pieces of the strata are broken away and removed from the system via stream 10.

This stratification and breaking away process occurs over length of time, and usually the incoming wastewater stream returns to more normal levels of these salts of its own accord or the beginnings of stratification are noted in time to avoid losing recycle to the reactor 6 or losing significant amounts of microorganisms through the stream 10. In the absence of the present invention the flow rates of wastewater are dramatically reduced, i.e. up to about 80% by volume, as required to prevent violations of permits for effluent for total suspended solids, which is usually accomplished by reducing capacity of the production plant(s) from which the wastewater originates for a duration until the system returns to normal operation.

If on the other hand, the NaCl and $CaCl_2$ content of the wastewater coming into the clarifier becomes too low compared to the wastewater already in the clarifier, then the sludge begins to exhibit a "float then sink" behavior and can be carried from the clarifier in stream 10. This reduction of the salt content of the incoming wastewater stream can occur, for example, in the opposite of the scenario discussed in the next-to-last paragraph or because of heavy rainfall or snowmelt being absorbed into the system.

What fluctuations in salt content will be acceptable depends on several factors, such as the throughput of the system, the salt concentrations to which the system is accustomed, and the relative size of the reactor as compared to the secondary clarifier (and thus the ability of the reactor to absorb or cushion sudden changes in the influent wastewater), availability of an equalization basin and the like.

In general, however, it is preferred that for systems having an accustomed average salt content of about 3 weight percent, the content of the wastewater feed to the secondary clarifier should be controlled to within the range of from about 2.9 to about 3.1 percent.

For systems having an accustomed average salt content of about 6 percent, the salt content of the wastewater feed to the secondary clarifier should be controlled to within the range of from about 5.8 to about 6.2 percent.

Finally, for systems having an accustomed average salt content of about 11 percent, the content of the wastewater feed to the secondary clarifier should be controlled to within the range of from about 10.5 to about 11.5 percent.

The acceptable limits for a given process (i.e., what is "too high" or "too low" in the discussion above) can be more precisely determined by routine experimentation, however, given the guidance provided by the discussion above and by the following examples:

EXAMPLE 1

A bio-oxidation process was simulated by an arrangement of two 50-liter feed tanks containing in the feed 650 ppm propylene glycol, nutrients consisting of 500 ppm ammonium chloride and 500 ppm potassium phosphate, about 3 ppm of an antifoam agent known as PG 112-2, a polyglycol commercially available from The Dow Chemical Company and 6.1 weight percent of sodium chloride. The second feed tank is the same, except that it has only 0.5 weight percent sodium chloride. The first feed tank is connected through metering feed pump (an FMI Lab Pump) to three 1.4-liter serially-connected completely stirred tank reactors (CSTR) containing halophillic microorganisms which were procured from an industrial wastewater treatment system facility and which overflow into a 7-liter secondary clarifier for sludge settling. The clarifier has an overhead clarified water effluent and a bottom line recycling to the first CSTR in the series, also by means of an FMI Lab Pump. The reactors are held in place and agitated by MultiGen TM Agitation Stations and agitated at 650 rpm at 35° C. The pH was controlled at 8.1-8.3 and air was introduced through diffuser stones at a regulated flow rate of 2.5 standard cubic feet per hour (70.8 liters per hour). The reactor dissolved oxygen concentration was continuously monitored using YSI dissolved oxygen meters and probes. For four days the feed was introduced at a flow rate of 17 ml/min. to stabilize the system, obtain baseline data and the recycle flow rate was set at 12.5 milliliters per minute. During this time the sludge blanket was formed with overflow sludge settling at a uniform consistent rate and the upper clarifier was clear.

After the four day baseline period the second feed tank was employed which was the same as above, except that the feed had a salt content (NaCl) of 0.5 weight percent. The feed and recycle flow rates were reduced to 3.5 and 6.5 ml/min., respectively. After approximately twenty hours of operation with the reduced salinity feed, the biomass concentration in the clarifier and CSTRs increased to about 16,000 ppm of mixed liquor suspended solids and a high foaming rate was noted. The recycle flow rate was decreased further to 2.5 ml/min. and the system was operated for another three days before the experiment was terminated because of catastrophic loss of biomass as a result of severe reactor foaming and claritier upset.

Results from this example indicate that changing salinity levels in biological wastewater treatment processes will drastically affect the settling of the sludge in the clarifier. Under normal conditions, e.g., stable salinity levels, sludge entering the clarifier settles to the bottom and forms a compact blanket. The clear supernatant liquid above the sludge blanket provides a good quality effluent. In the above example, only a few hours after the low salinity feed was introduced, the incoming sludge to the clarifier began floating to the surface and then gradually sinking to the bed when the system salinity became about 5 weight percent NaCl concentration. Also, the liquid in the clarifier began to turn dark brown and turbidity increased. After about 40 hours of operation with the low salinity feed, at which time the salt concentration was about 2 weight percent, a thick layer of floating sludge developed right below the water surface and continued propagating. Eventually, the thin floating sludge covered most of the clarifier. The thin sludge bed on the bottom of the clarifier expanded, forming a fluffy sludge blanket. As a result dilute recycle sludge was returning to the reactors. The observed difference between the incoming sludge flow and the retained sludge slurry in the clarifier resulted from the density difference caused by the change in the salt concentration.

EXAMPLE 2

In a commercial three train "UNOX" type bio-oxidation (biox) plant, having 4 CSTRs and a clarifier for each train with about 600,000 gallons/train (2,271,247 liters/train) capacity and thus a total capacity of about 1.8 million gallons (6.822 million liters) and in which the clarifier capacity is about 2.6 million gallons (9.854 million liters), the plant is operated on an aqueous feed from a production plant in which the wastewater contained a Total Organic Carbon (TOC) content of 400-500 ppm of which 70 weight percent was propylene glycol, 20 weight percent was ethylene glycol and 10 weight percent was various other glycols and methanol. The flow rate through the biox plant was about 10,000 gallons per minute (37,900 liters/min.) for all three trains with a CSTR residence time of about 0.5 hours and a residence time for one whole train, e.g., 4 CSTRS, of about 2 hours, a mixed liquor suspended solids concentration of about 8,000-9,000 ppm, and a salinity content of about 6.2 weight percent, varying from about 5.5-7 weight percent, at a temperature of about 35° C. The pH was controlled at between 7.6 and 8.3 with phosphoric acid and nutrient was anhydrous ammonia at residual concentration. In the operation of this plant it has been observed that the change in salinity concentration of 1-2 weight percent in reactor feed results in poor settling of the sludge when it reaches the clarifier. Instead of settling to the bottom of the clarifier and forming a compact bed with a clear supernatant effluent, the sludge dramatically rises to the top of the clarifier surrounding the centerwell, in a turbulent rolling motion. This disruption of the clarifier bed results in a great loss of biomass through the effluent. Controlling the variation in salt concentration to the reactor by adding treated brine to the feed or dilution water is expected to prevent clarifier settling disturbances.

EXAMPLE 3

In a laboratory arrangement as essentially set forth in Example 1, except that only 1 50-liter feed tank was employed and the clarifier was a 24-liter vessel, an experiment was carried out to determine what effect on settling behavior results from changes in salinity or salt concentration, using NaCl as a representative salt. As a result of the experiment it was observed that a change of as low as 1 weight percent in salinity over a period of about 3 to 4 hours caused a drastic settling upset. The effect noted was that the total suspended solids exceeded acceptable levels and the sludge floated and rolled instead of settling to the clarifier bottom. It is believed that the existence of density gradients in the clarifier, resulting from salinity variation or changes over time between the incoming flow of mixed-liquor solids to the clarifiers and the liquor existing in the clarifier.

The feed solution and recycle solution were introduced to the top of the first CSTR and the flow gravitationally overflowed through the next reactor in series until it flowed into the clarifier. The reactor agitation was 650 rpm, temperature was 35° C., pH was controlled in the range of 7.8 to 8.5, and air was introduced into the reactors through the impeller/agitator shaft at a flow rate of approximately 2.5 to 5.0 standard cubic feet per hour (70.8 to 141.6 liters per hour). The CSTR dissolved oxygen (DO) concentration was continuously monitored by commercially available YSI DO meters and probes.

During the first twelve days a standard feed solution, same as for Example 1, was introduced at a flow rate of 17 ml/min. to stabilize the system and allow baseline data. The feed consisted of propylene glycol (500 ppm), ammonium chloride (500 ppm), potassium phosphate (500 ppm), and 6.5 weight percent salt (NaCl). The system was started with an inoculum of halophillic microorganisms from an industrial wastewater treatment facility. The sludge recycle rate was set at 8.3 ml/min. During this time sludge settling occurred, a clear supernatant effluent was removed and a sludge blanket formed at the bottom of the clarifier.

After 12 days of operation, the salinity of the feed solution was changed to 4.7 weight percent. Thereafter, the system was run for 3 additional days. Only a few hours after changing to lower salt content feed, the incoming sludge to the clarifier began floating to the surface of the clarifier and then gradually sinking. After one day of operation on the lower salt feed, the system stabilized and the operation continued for two more days. The effluent salt concentration upon termination of the run was 5.43 weight percent.

In a similar experiment, operated initially like Example 3, the normal salt concentration was changed to lower salt concentration for 1-3 days and then a high salt concentration, about 8 weight percent, was introduced. The effects on settling at each change were observed to be similar to those described in Example 3, but when the high salt concentration feed was introduced the sludge blanket at the bottom of the clarifier broke up completely and the experiment was terminated.

What is claimed is:

1. In a biological wastewater treatment process wherein the accustomed average salt content of incoming wastewater to be treated is about 3 percent by weight or greater, as measured by silver nitrate titration, and including secondary clarification and the use of salt-tolerant microorganisms, the improvement comprising monitoring the salinity of the wastewater upstream of the secondary clarification and increasing the salt content of the wastewater upstream of the secondary clarification to a degree sufficient to maintain acceptable separation and sludge thickening in said secondary clarification step by adding a salt, when decreases in the salt content of the wastewater upstream of the secondary clarification step are observed.

2. The improved process of claim 1, wherein the process is an activated sludge process.

3. The improved process of claim 2, wherein the process is an activated sludge process which employs oxygen-enhanced air.

4. The improved process of claim 3, wherein the process is an activated sludge process which employs substantially pure oxygen.

5. The improved process of claim 1, wherein the process monitors the salinity content for a salt selected from the group consisting of NaCl and $CaCl_2$.

6. The improved process of claim 1, wherein the average residence time of wastewater in a reactor containing salt tolerant microorganisms is less than about 24 hours.

7. The improved process of claim 1, wherein the average residence time of wastewater in a reactor containing salt tolerant microorganisms is less than about 12 hours.

8. The improved process of claim 1, wherein the average residence time of wastewater in a reactor containing salt tolerant microorganisms is less than about 4 hours.

9. The improved process of claim 1, wherein the accustomed average salt content of the incoming wastewater to be treated is in the range of from about 3 to about 8 percent, as measured by silver nitrate titration.

10. The improved process of claim 1, wherein the accustomed average salt content of the incoming wastewater for the microorganisms is about 3 weight percent and the waste water flowing to the secondary clarification step is maintained within the range of from about 2.9 to about 3.1 weight percent.

11. The improved process of claim 1, wherein the accustomed average salt content of the incoming wastewater for the microorganisms is about 6 weight percent and the wastewater flowing to the secondary clarification step is maintained within the range of from about 5.8 to about 6.2 weight percent.

12. The improved process of claim 1, wherein the accustomed average salt content of the incoming wastewater for the microorganisms is about 11 weight percent and the wastewater flowing to the secondary clarification step is maintained within the range about 10.5 to about 11.5 weight percent.

* * * * *